(12) United States Patent
Arroyo et al.

(10) Patent No.: US 7,703,670 B2
(45) Date of Patent: Apr. 27, 2010

(54) METHOD AND APPARATUS FOR CREATING AND EXPOSING ORDER STATUS WITHIN A SUPPLY CHAIN HAVING DISPARATE SYSTEMS

(75) Inventors: Jorge A. Arroyo, Carmel, IN (US);
David U. Shorter, Lewisville, TX (US);
Robert M. Szabo, Boca Raton, FL (US);
Filip J. Yeskel, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/048,141

(22) Filed: Mar. 13, 2008

(65) Prior Publication Data
US 2008/0162178 A1    Jul. 3, 2008

Related U.S. Application Data

(62) Division of application No. 09/896,774, filed on Jun. 29, 2001, now Pat. No. 7,366,772.

(51) Int. Cl.
*G06F 7/00* (2006.01)

(52) U.S. Cl. ............................. 235/376; 705/8; 705/28; 705/76; 717/100

(58) Field of Classification Search ................. 705/28, 705/8, 10, 65, 76; 717/100; 235/376, 385; 713/182, 186
See application file for complete search history.

(56) References Cited

U.S. PATENT DOCUMENTS

| | | | |
|---|---|---|---|
| 5,315,508 A | 5/1994 | Bain et al. | |
| 5,761,661 A * | 6/1998 | Coussens et al. | 707/9 |
| 5,953,707 A | 9/1999 | Huang et al. | |
| 6,085,493 A | 7/2000 | DeBusk et al. | |
| 6,141,647 A | 10/2000 | Meijer et al. | |
| 6,167,378 A | 12/2000 | Webber | |
| 6,226,618 B1 | 5/2001 | Downs et al. | |
| 6,262,317 B1 | 7/2001 | Becker et al. | |
| 6,269,343 B1 | 7/2001 | Pallakoff | |
| 6,463,420 B1 | 10/2002 | Guidice et al. | |
| 6,618,808 B1 | 9/2003 | Johnson et al. | |
| 6,629,081 B1 | 9/2003 | Cornelius et al. | |

(Continued)

OTHER PUBLICATIONS

B. Mann, "Call Centers to Contact Centers: Handling Asynchronous Messaging in the Real World," International Journal of Call Center Management, (vol. 2, No. 4, pp. 2-9. Jul. 2000).

(Continued)

*Primary Examiner*—Andrew Joseph Rudy
(74) *Attorney, Agent, or Firm*—Novak Druce & Quigg

(57) ABSTRACT

The present invention describes a method and system for creating and exposing order status within a supply chain of trading partners having disparate systems. A trading partner exchange (TPE) interfaces with each of the disparate systems and gathers information pertaining to a particular transaction. The information can be made available to an access platform through an access platform interface. Initially, a transaction is reported to the TPE where it is assigned a unique identifier. Subsequent activities pertaining to the transaction which are reported to the TPE by the trading partners can be linked to the unique identifier. By using the access platform, a customer or any trading partner can acquire the status of a particular order from the TPE.

4 Claims, 3 Drawing Sheets

U.S. PATENT DOCUMENTS

| | | |
|---|---|---|
| 6,671,686 B2 | 12/2003 | Pardon et al. |
| 6,684,213 B1 | 1/2004 | Schell et al. |
| 6,701,303 B1 | 3/2004 | Dunn et al. |
| 6,738,975 B1 | 5/2004 | Yee et al. |
| 6,816,865 B2 | 11/2004 | O'Brien et al. |
| 6,938,001 B2 | 8/2005 | Kimmel, Jr. |
| 6,947,903 B1 | 9/2005 | Perry |
| 6,954,736 B2 | 10/2005 | Menninger et al. |
| 6,974,928 B2 | 12/2005 | Bloom |
| 6,975,922 B2 | 12/2005 | Duncan |
| 6,980,962 B1 | 12/2005 | Arganbright et al. |
| 6,996,538 B2 | 2/2006 | Lucas |
| 7,028,187 B1 | 4/2006 | Rosen |
| 7,069,235 B1 | 6/2006 | Postelnik et al. |
| 7,089,205 B1 * | 8/2006 | Abernethy .................. 705/37 |
| 7,165,174 B1 | 1/2007 | Ginter et al. |
| 7,200,749 B2 | 4/2007 | Wheeler et al. |
| 7,203,658 B1 | 4/2007 | Gidwani et al. |
| 7,289,964 B1 | 10/2007 | Bowman-Amuah |
| 7,366,772 B2 * | 4/2008 | Arroyo et al. ................ 709/223 |
| 7,451,108 B1 * | 11/2008 | Skuriat et al. ................. 705/37 |
| 7,487,110 B2 * | 2/2009 | Bennett et al. ................ 705/26 |
| 2002/0013721 A1 | 1/2002 | Dabbiere et al. |
| 2002/0026321 A1 | 2/2002 | Faris et al. |

OTHER PUBLICATIONS

"Configurable Transaction Routing," IPNet Solutions, Inc. (2000).
"XML White Paper: Legacy System Integration Using XML," XML Solutions Corporation, <www.xmls.com/resources/whitepapers.xml?dref=resources whitepapers>.

* cited by examiner

METHOD AND APPARATUS FOR CREATING AND EXPOSING ORDER STATUS WITHIN A SUPPLY CHAIN HAVING DISPARATE SYSTEMS

CROSS REFERENCE TO RELATED APPLICATIONS

This application is a divisional application of, and accordingly claims the benefit from, U.S. patent application Ser. No. 09/896,774, now issued U.S. Pat. No. 7,366,772, which was filed in the U.S. Patent and Trademark Office on Jun. 29, 2001.

BACKGROUND OF THE INVENTION

1. Technical Field

The present invention relates to the field of electronic Business (e-Business), and more particularly, to a method and apparatus for creating and exposing order status within a supply chain having disparate systems.

2. Description of the Related Art

The pervasiveness of the Internet has allowed companies to exploit electronic communications to engage in what is commonly known as e-Business activities with their customers. E-business involves conducting business on the Internet and not only includes buying and selling goods and services, but can also include servicing customers and collaborating with trading or business partners. To accommodate this vast range of activities, companies utilize a variety of channels for interacting with Web sites that offer e-Business activities.

A channel is a particular communication medium or a logical medium that can be used to offer a subset of activities that conglomerate to form e-Business activity. For example, a channel for providing book reviews can be a subset of book selling activities in a book selling e-Business. Each channel can support various modes of access. For example, a book review channel can provide access to the book selling e-Business activity through Web browsers, wireless devices such as wireless access protocol (WAP) enabled phones and personal digital assistants (PDA's). As demand for e-Business activities increases, so does the need to provide additional channels to accommodate a variety of e-Business activities.

A large number of vendor products have been developed to provide additional channels that can accommodate a variety of e-Business activities. Many vendor products can support one or more limited channels and are typically targeted towards specialized activities within a particular industry. Still, in order to diversify the number of available channels, a company has to purchase, install and operate multiple vendor application products. Diversification is eminent since no singular vendor product provides a complete solution capable of supporting all the e-Business activities within a particular industry. These vendor products have typically been developed independent of other vendors and in a piecemeal fashion to meet existing customer demand. Despite this piecemeal implementation, there is no planned support for vendor application products inter-operating with each other in a larger e-Business framework which includes the full range of supported channels. These vendor solutions which are independently developed for supporting different channels and which have different architectures are called disparate systems. Significantly, disparate systems make it very difficult to integrate diversified e-Business solutions.

Each trading partner within an e-Business transaction chain can utilize one or more of these disparate systems. A trading partner is a business that provides a specialized service. For example, in order to satisfy a customer order for widgets, the transaction can involve trading partners such as a retailer, a manufacturer, a distributor, and shippers. Since these trading partners are typically independent organizations, each trading partner can have a unique or proprietary information technology (IT) solution.

The use of disparate systems among trading partners can significantly limit a customer's ability to track a particular transaction from initiation of an order to the receipt of a good or service. Consequently, it can be difficult, if not impossible, for a customer or a trading partner to accurately track an order as it moves throughout the supply chain. While a customer may have the ability to track an order while it is within the possession of a particular trading partner, the ability to track the order can be lost once the order passes to another trading partner in the chain.

Furthermore, a customer is often burdened by having to utilize a plurality of channels and interfaces in order to access tracking information. For example, a customer might have to utilize a web browser interface to track an order with one trading partner and then have to use a telephone to track the same order with another trading partner.

SUMMARY OF THE INVENTION

The present invention describes a method and system for creating and exposing order status within a supply chain of trading partners having disparate systems. The method for exposing order status in a supply chain having disparate systems can include receiving an order initiating a transaction from a first trading partner system. A status reported by a second trading partner system can be linked to the received order. The first and second trading partner systems can be disparate systems. The linked status corresponding to the transaction can be reported and formatted for a particular channel.

The linking step can include receiving an identifier for the status reported by the second trading partner. The identifier can correspond to the transaction. The received identifier can be linked to an assigned identifier corresponding to the transaction. In response to a query issued across an access platform accessible by customers and trading partners, the reporting step can report order status information.

In a further aspect of the invention, a method for exposing order status in a supply chain having disparate systems is provided. The method can include receiving at a central exchange, an initial order for a transaction from one of a plurality of trading partners having disparate systems. The central exchange can assign a unique identifier to the initial order. An identifier identifying an activity status from the trading partners for a transaction related to the order can be linked to the unique identifier. In response to a request for information, requested information can be provided to a requester based on the linked identifier and the unique identifier. The requested information can be formatted for communication over a selected channel, and sent to a requester.

In a further aspect of the invention, there is disclosed a system for exposing order status in a supply chain having disparate systems. The system can include a trading partner exchange (TPE) which can be communicatively interfaced to multiple trading partners. The TPE can identify an initial transaction and link corresponding trading partner transaction status information with the initial transaction. An access platform communicatively linked with the TPE can facilitate formatting the transaction status information according to a selected channel format. An access interface communicatively linked to the TPE, can facilitate communication with the access platform.

BRIEF DESCRIPTION OF THE DRAWINGS

There are presently shown in the drawings embodiments of which are presently preferred, it being understood, however, that the invention is not so limited to the precise arrangements and instrumentalities shown, wherein.

DETAILED DESCRIPTION OF THE INVENTION

The present invention describes a method and system for creating and exposing order status within a supply chain of trading partners utilizing disparate systems. Disparate systems are independently developed vendor products or in-house developed systems for supporting different channels and which have different architectures. Significantly, disparate systems make it very difficult to integrate diversified e-Business solutions. The present invention provides a trading partner exchange (TPE) which can communicate with and process information received from the various disparate systems. The TPE can assign an internal unique transaction identifier to a consumer transaction. Each trading partner can notify the TPE of its activities corresponding to the consumer transaction by utilizing a trading partner order identification. The TPE can make an association linking the trading partner order identification with the internal unique identifier for the consumer transaction. Actions taken by a trading partner regarding a particular transaction can be reported to the TPE. The TPE can interface with an access platform that facilitates access to information in the TPE through various communication channels. A customer wishing to obtain information from the TPE on a particular transaction can utilize any of the access channels provided by the platform. By cross referencing the various trading partner order identifications using the internal unique transaction identifier, the TPE can provide or expose the order status at any point throughout transaction processing chain.

Figure 1:
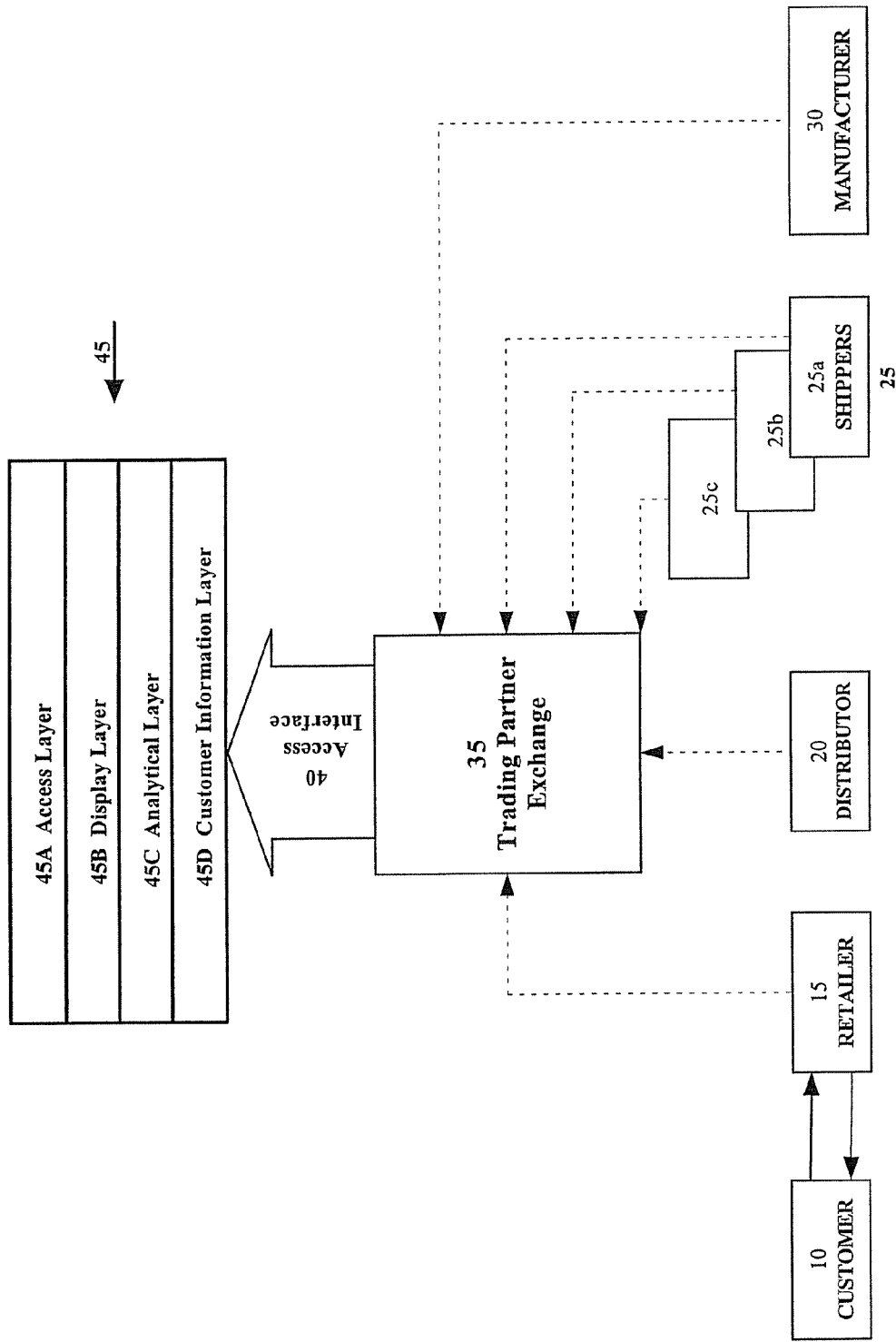
FIG. 1 is a high level block diagram of an exemplary system for creating and exposing of order status within a supply chain in accordance with the inventive arrangements.

FIG. 1 is a high level block diagram of an exemplary system for creating and exposing of order status within a supply chain in accordance with the inventive arrangements. The system includes disparate systems associated with trading partners, such as, retailer 15, distributor 20, shippers 25a, 25b, 25c, and manufacturer 30. Typically, a customer 10 can be linked to the system though a retailer 15. Each trading partner system 15, 20, 25, 30 can be communicatively linked to the TPE 35. The TPE 35 can have an integrated access interface 40, which permits communication with an access platform 45. A customer or a trading partner can use, for example, a browser, to query TPE 35 through the access interface 43 and display order status information in the browser.

Figure 2:
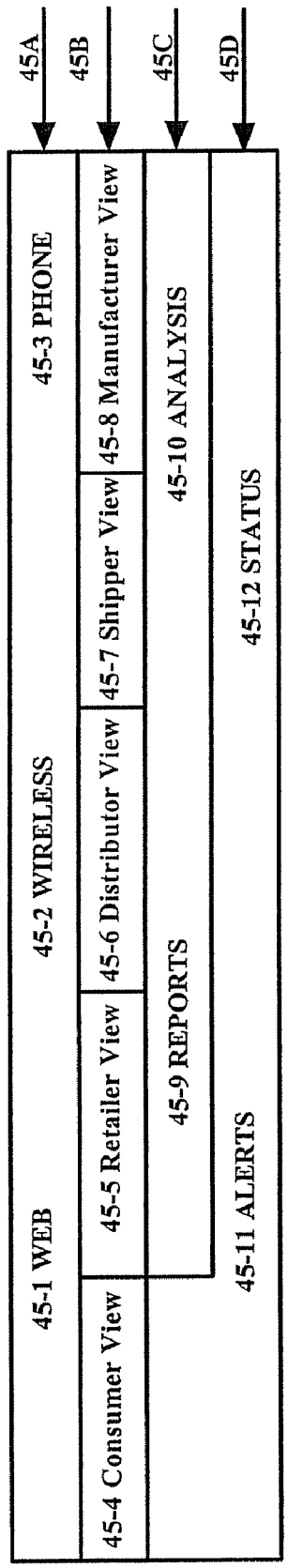
FIG. 2 is a high level block diagram of an exemplary access platform as shown in FIG. 1.

FIG. 2 is a high level block diagram of an exemplary access platform as shown in FIG. 1. The access platform 45 can have a layered architecture and can provide access through the various layers. A first access layer 45A can provide access through a web channel 45-1, a wireless channel 45-2 and a telephone channel 45-3. The access layer can be programmed to communicate using any of a variety of protocols such as wireless access protocol (WAP), TCP/IP, protocols necessary for communication through the public switched telephone network (PSTN), as well as cellular services. A second display layer 45B can provide viewing services through the various channels by providing views such as a consumer view 45-4, a retailer view 45-5, a distributor view 45-6, a shipper view 45-7 and a manufacturer view 45-8. For example, the display layer 45B can format status information with suitable markup language for presentation within a browser. A third analytical layer 45C can provide services such as reports 45-9 and analysis 45-10. A fourth customer informational layer 45D can provide services such as alerts 45-11 and status 45-12. The layers can be arranged in a manner such that only the trading partners have access to reports 45-9 and analysis 49-10 through the retailer view, distributor view, shipper view and manufacturer view. This arrangement of the layers can ensure data integrity and security. It should be appreciated that the access platform can exist in various layer configurations such that access to various channels can be provided. Accordingly, the invention is not so limited to the specific embodiment disclosed herein.

Figure 3:
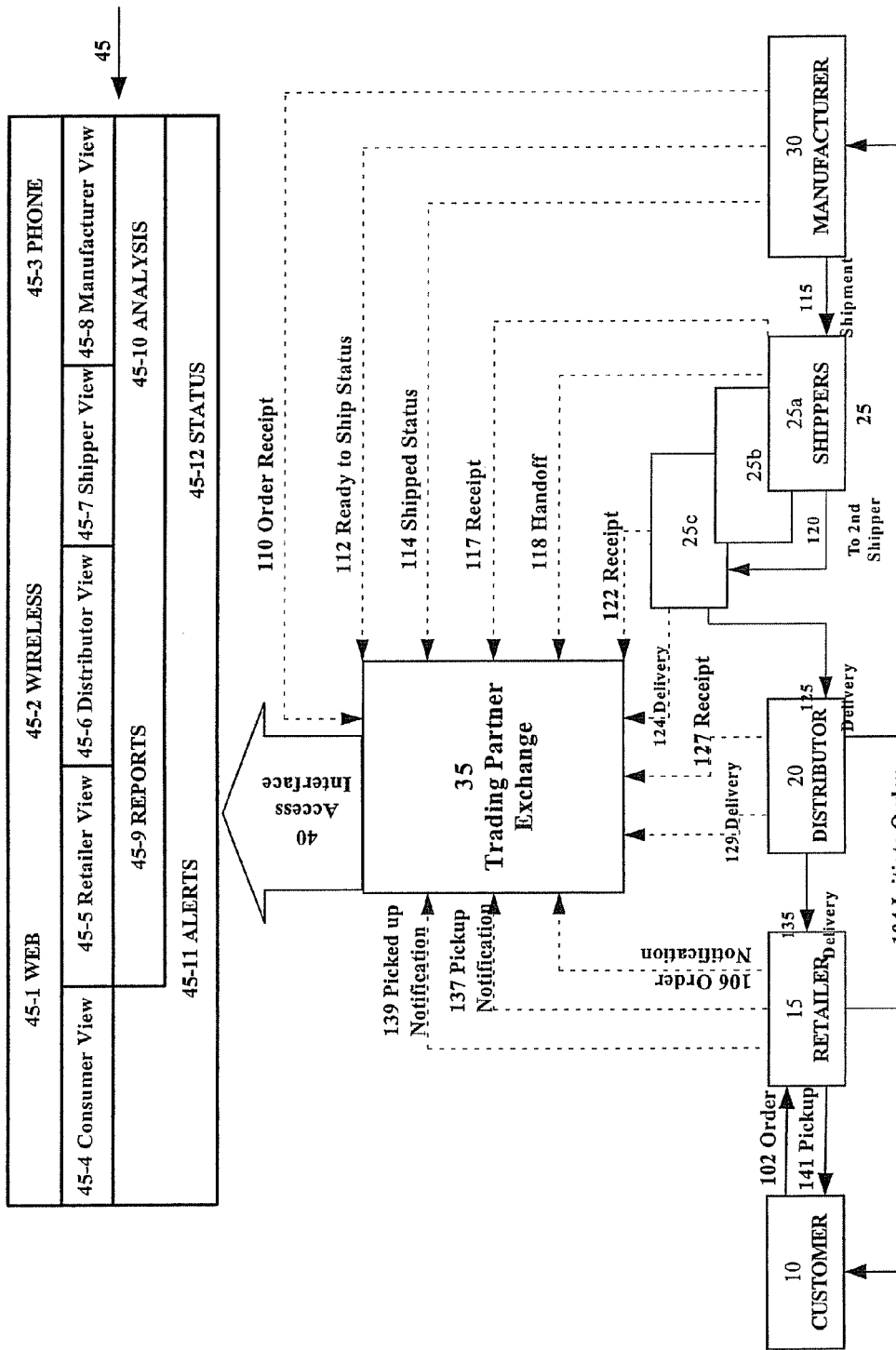
FIG. 3 is a block diagram of an exemplary system detailing the creating and exposing of order status within a supply chain in accordance with the inventive arrangements.

FIG. 3 is a block diagram of an exemplary system detailing the creating and exposing of order status within a supply chain in accordance with the inventive arrangements. Transactions are typically initiated by request from a customer 10 to a trading partner, for example, a retailer 15. Other trading partners can include, a distributor 20, a manufacturer 30, and shippers 25 (25a, 25b, 25c). Each of the IT systems utilized by the various trading partners can communicate with the TPE 35.

In operation, a customer 10 can start a transaction by initiating an order 102 to a retailer 15. Upon initiation of the order 102, the retailer 15 can send an order notification 106 to the TPE 35 using a retailer order identification (RET_ORD_ID). Upon receipt of the order notification 106, the TPE 35 can assign a unique identifier (TPE_ORD_ID) to the retailer order identification. The retailer 15 can initiate an order 104 with a trading partner, for example, manufacturer 30. The manufacturer 30 can notify the TPE 35 of the order receipt 110 using a manufacturer order identification (MANU_ORD_ID). The MANU_ORD_ID can be coded in such a manner that the associated TPE_ORD_ID can be readily discerned. For example, the TPE_ORD_ID can be concatenated to the MANU_ORD_ID. Similarly, any order identification assigned by a trading partner can likewise identify the associated TPE_ORD_ID. It should be appreciated that one skilled in the art will recognize that an identifier can be passed amongst the trading partners and TPE in reference to a particular transaction or order so that reference can be made to that transaction or order.

Upon receipt of the notification of the order receipt 110, the TPE 35 can link the manufacturer order identification with the unique identifier (TPE_ORD_ID) for the transaction. Once the manufacturer 30 is ready to ship the order, the manufacturer 30 can notify the TPE 35 with a notification of ready to ship status 112 (MANU_RDY_SHP_ORD_ID). The ready to ship status 112 can be linked to the unique identifier (TPE_ORD_ID) for the transaction. The trading partner, manufacturer 30, can ship the order 115 to a first shipper 25a. Once the order has been shipped, the manufacturer 30 can notify the TPE 35 with a notification of shipped status 114 (MANU_SHPPD_ORD_ID). The shipped status 114 can also be linked to the unique identifier (TPE_ORD_ID) for the transaction.

Upon receipt of the shipment 115, shipper 25a can notify the TPE 35 with a notification receipt status 117 (SHP25a_RCV_ORD_ID). The notification of receipt status 117 can be linked to the unique identifier (TPE_ORD_ID) for the transaction. Shipper 25a can ship 120 the order to a second shipper 25c. Upon shipment, shipper 25a can send a notification of handoff status 118 (SHP25a_HNDOFF_ORD_ID) to the TPE 35. The notification of handoff status 118 can also be linked to the unique identifier (TPE_ORD_ID) for the transaction.

Upon receipt of the shipment 120, shipper 25c can notify the TPE 35 with a notification receipt status 122 (SHP25c_RCV_ORD_ID). The notification of receipt status 122 can be linked to the unique identifier (TPE_ORD_ID) for the transaction. Shipper 25c can deliver 125 the order to another trading partner, for example the distributor 20. Upon shipment, shipper 25a can send a notification of delivery status 124 (SHP25c_DLVR_ORD_ID) to the TPE 35. The notification of delivery status 124 can also be linked to the unique identifier (TPE_ORD_ID) for the transaction.

Upon receipt of the delivery 125, a trading partner, in this case distributor 20, can notify the TPE 35 with a notification receipt status 127 (DIST_RCV_ORD_ID). The notification of receipt status 127 can be linked to the unique identifier (TPE_ORD_ID) for the transaction. In one aspect of the invention, a trading partner, for example, distributor 20, can deliver the order directly to the customer 10. Upon delivery 130 to the customer 10, the distributor 20 can send a notification of delivery status 129 (DIST_DLVR_ORD_ID) to the TPE 35. The delivery status 129 notification can be linked to the unique identifier (TPE_ORD_ID) for the transaction.

Alternately, the distributor 20, can deliver the order 135 to a trading partner, for example, retailer 15. Upon delivery 135 to the retailer 15, the distributor 20 can send a notification of delivery status 129 (DIST_DLVR_ORD_ID) to the TPE 35. The delivery status notification 129 can also be linked to the unique identifier (TPE_ORD_ID) for the transaction. Upon receipt of the delivery 135, the retailer 15 can send a notification of ready for pickup status 137 (RET_PCKUP_ORD_ID) to the TPE 35. The ready for pickup status notification 139 can be linked to the unique identifier (TPE_ORD_ID) for the transaction. Additionally, the notification of pickup message can be sent to customer 10 via email, fax, telephone call or mail. Once the order has been picked up 141 from the retailer 15, the retailer 15 can send a notification 139 of picked up status (RET_PCKDUP_ORD_ID) to the TPE 35. The picked up status notification 139 can also be linked to the unique identifier (TPE_ORD_ID) for the transaction. At this point, all the information necessary to track an order as the order moves between the various disparate systems of the trading partners is linked to the unique identifier (TPE_ORD_ID) assigned to the transaction by the TPE.

Since all the individual trading partners activities pertaining to the processing of a particular transaction can be reported to the TPE, all this information can be exposed and made available through the access interface 40 and access platform 45. Customer 10, for example, can use a wireless device, such as a PDA, to access the customer view 45-4 via the wireless channel 45-2. The consumer view 45-4 can allow access only to alerts 45-11 and status 45-12. In another example, distributor 20 can use a Web browser to access the distributor view 45-6, and access, reports 45-9, analysis 45-10, alerts 45-11 and status 45-12.

In accordance with the inventive arrangements, asynchronous messaging can be used for communicating between the TPE 35 and the trading partners 15, 20, 25 and 30, and the access platform 45. Asynchronous messaging is the communication of a response message that can be sent at a later, often indeterminate time, and, therefore, lacks immediacy. Hence, the transaction does not occur in the actual time it takes to send the message. Emails, letters and facsimiles (FAX) are examples of asynchronous messaging and can generally be used for requests when there is no immediate urgency. A reply to an email, for example, can be sent days after a request. While it might be advantageous to utilize asynchronous messaging as the communications vehicle between the TPE 35 and the trading partners 15, 20, 25 and 30, and the access platform 45, the invention is not so limited.

Accordingly, another embodiment of the invention can include synchronous messaging which is the communication of messages wherein corresponding replies can occur in the actual time taken to process the message and send the reply. For example, a customer calling a customer care center utilizes synchronous communication. Though the customer can be placed in a queue of customers waiting to be served, once the customer is connected to a customer care agent, the customer request can be handled in realtime.

The present invention can be realized in hardware, software, or a combination of hardware and software. A method and system for ensuring data consistency amongst disparate systems according to the present invention can be realized in a centralized fashion in one computer system, or in a distributed fashion where different elements are spread across several interconnected computer systems. Any kind of computer system, or other apparatus adapted for carrying out the methods described herein, is suited. A typical combination of hardware and software can be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form

The invention claimed is:

1. A computer readable storage medium having stored thereon, a computer program having a plurality of code sections, said code sections executable by a computer for causing the computer to perform a method for exposing order status in a supply chain having disparate systems, comprising the steps of:

provide a system including a trading partner exchange communicatively interfacing with a plurality of disparate trading partner systems, an access platform accessible by customers and trading partners via a plurality different communication channels, and an integrated access interface providing an interface between the trading partner exchange and the access platform;

the trading partner exchange electronically receiving an order notification corresponding to an order created by a first trading partner system, the received order notification being associated with a first trading partner system identifier, the created order defining a transaction between a customer and a first trading partner;

the trading partner exchange automatically assigning a unique transaction identifier to the transaction responsive to receiving the order notification;

the trading partner exchange electronically receiving at least one activity notification of an activity performed by at least a second trading partner system, the at least one activity notification describing an action of a second trading partner corresponding to the transaction and being associated with a second trading partner system identifier, wherein the first trading partner system and the at least second trading partner system are disparate systems that jointly define a transaction processing chain;

the trading partner exchange automatically associating the unique transaction identifier to the second trading partner system identifier responsive to receiving the activity notification;

the trading partner exchange linking the unique transaction identifier to the order notification and the at least one activity notification and, wherein cross referencing the first and second trading partner system identifiers using the unique transaction identifier provides a status of the transaction at a point in the transaction processing chain;

the trading partner exchange electronically reporting status of the transaction via the integrated access interface;

the trading partner exchange electronically generating transaction analysis information based upon the unique transaction identifier, the order notification, and the at least one activity notification;

the trading partner exchange providing the first, the second, or another trading partner access to the transaction analysis information;

the trading partner exchange electronically generating transaction tracking information based upon the unique transaction identifier, the order notification, and the at least one activity notification;

the trading partner exchange providing access to the transaction tracking information to the customer who initiated the order while denying the customer access to the transaction analysis information; and the trading partner exchange formatting at least one of the transaction analysis information and the transaction tracking information in response to selecting one of a plurality of communication channels for conveying information, the formatting corresponding to a particular one of the plurality of communication channels selected.

2. The computer readable storage medium of claim 1, wherein the access platform has a plurality of layers though which access to the trading partner exchange is provided, the layers including an access layer, a display layer, and an analytical layer, wherein the access layer provides access through the plurality of different communication channels, wherein the display layer provides different views for different types of trading partners, wherein the analytical layer provides reports, and wherein trading partners using disparate computing systems are able to access reports of the analytical layer through views of the display layer via communication channels of the access layer.

3. The computer readable storage medium of claim 1, wherein the first trading partner system and the second trading partner system are independently developed systems having different architectures.

4. The computer readable storage medium of claim 1, within the trading partner exchange is remotely located from the first trading partner system and the second trading partner system.

* * * * *